W. T. COLE.
HOSE.
APPLICATION FILED FEB. 5, 1916.
1,235,878.
Patented Aug. 7, 1917.
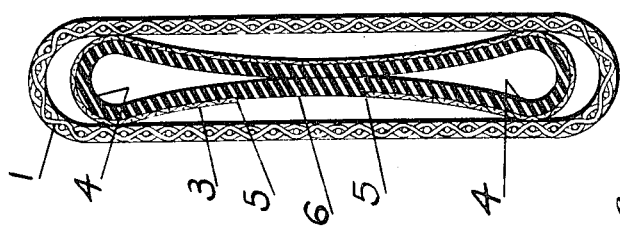
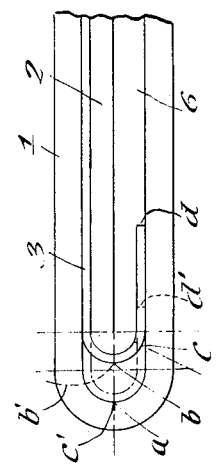
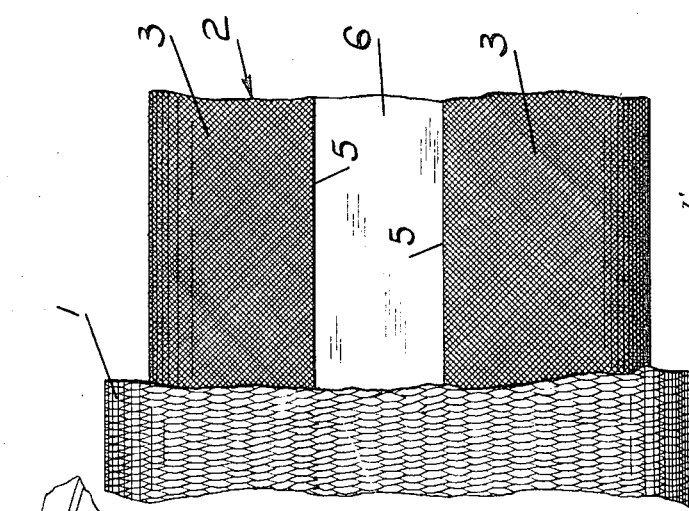
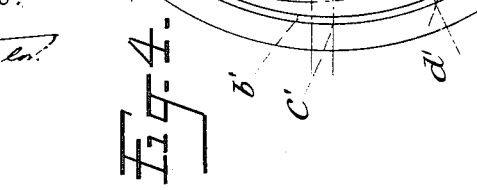
WITNESS:
S. G. Taylor
INVENTOR
William T. Cole,
BY
Ernest Hopkinson
HIS ATTORNEY

UNITED STATES PATENT OFFICE.

WILLIAM T. COLE, OF NEWTOWN, CONNECTICUT, ASSIGNOR TO FABRIC FIRE HOSE COMPANY, A CORPORATION OF NEW YORK.

HOSE.

1,235,878.  Specification of Letters Patent.  Patented Aug. 7, 1917.

Application filed February 5, 1916. Serial No. 76,363.

*To all whom it may concern:*

Be it known that I, WILLIAM T. COLE, a citizen of the United States, and a resident of Newtown, in the county of Fairfield and State of Connecticut, have invented certain new and useful Improvements in Hose, of which the following is a full, clear, and exact description.

This invention relates to hose and more particularly to the larger type of hose which is maintained in a flat or collapsed condition when not in use, and has for its object to provide means for enhancing the life of the hose.

Referring to the drawings:—

Figure 1 is a fragmental view of a hose in a flat condition embodying my invention.

Fig. 2 is a transverse section of Fig. 1.

Figs. 3 and 4 are diagrammatical fragmental views denoting the relative positions of the inner tube and outer casing.

The type of hose to which my invention particularly relates is made of an outer supporting casing of fabric and an inner waterproof tube. The tube is free from the casing and normally of smaller diameter, so that it may be easily withdrawn and replaced by another tube or repaired as occasion requires. Hose of this class are usually intended for emergency purposes, for instance they are often placed in buildings to be used in case of fire. It is thus not infrequent that a hose may never be used after it is installed, or only after so long a time that it will have become, through aging, incapable of withstanding the pressure of the water. The flattened portions are subjected to a sharp bend and continued exposure to atmospheric conditions. This causes these parts to deteriorate and accordingly they are the first parts of the hose to give way under strain.

In the present invention I make the outer casing 1 of any desired material, the inner tube 2 is made of a smaller diameter than the outer casing and is formed of a freely elastic material and fabric. The fabric part is made waterproof and extends more than half way around the circumference of the tube, and the freely elastic material extends the remainder of the distance thereby spanning the edges of the fabric. The tube is disposed in the casing so that when in its normal flattened state the fabric will comprise one side thereof and will extend around each folded portion to a suitable distance.

In the present embodiment of my invention the fabric 3 is made waterproof by covering it with a layer of rubber 4 which is continued across the gap made by the edges 5—5 of the fabric to form the freely elastic portion 6. The rubber may be made from a flat sheet and its edges lapped over prior to vulcanization to form the portion 6. This portion can thus be made thicker than the remainder of the layer which is used to waterproof the fabric so that when under stretch it will have the required strength.

As before remarked the folding of the hose and the continual exposure of these portions to the atmospheric conditions produce a weakness at these parts and the above described construction provides means whereby the sharp fold of the inner tube while directly opposite the fold in the outer casing when in flattened normal position will however, be disposed to one side thereof when the tube is expanded and the strain put upon the materials. This is obtained by making one of the flat sides of the tube of fabric comparatively non-stretchable, while the other side contains the elastic element 6 which freely yields under the pressure of the water, thereby expanding the tube to the supporting inner walls of the outer casing. The stretch being on but one of the flat sides of the inner tube it is obvious that the folded portions of this tube will not remain opposite the folded portions of the outer tube but will take a position to one side and when flattened will again assume its first position as shown in Fig. 2.

In Fig. 3 the outer casing 1 and inner tube 2 are shown diagrammatically in their flattened positions which they assume when not in use, the sharp folds *a* and *b* of the outer casing and inner tube respectively are in this position, so to speak, diametrically opposite each other. When however, the hose is expanded by the pressure of the water the inner tube, being of smaller diameter than the outer casing, will expand until it contacts therewith. The fabric portion 3 being substantially non-stretchable, the entire expansion must be provided for by the freely elastic rubber portion 6 spanning the gap between the ends of the fabric strip. The sharp fold *b* therefore instead of expanding out to contact with the sharp fold *a* will assume the position *b'*, and the line of the fabric denoted at *c* will take the position *c'*, while the end of the fabric strip *d* will move to the position *d'*.

Fig. 4 shows the inner tube 2 in dot and dash lines in its partially inflated position before it has expanded out to the casing 1, and in full lines after it has expanded to contact throughout with the casing 1. The inner tube is shown in contact with the casing at the upper central line *e* and the tube and casing shown as inflated to assume circular cross-sections. This is for convenience of illustration, for in actual practice the outer casing would not be entirely inflated until the inner casing was also. In these relative positions the center of the inner tube is at *f* and the center of the casing at *g*. The point *b* when the inner tube is finally expanded takes the position *b'*, the point *c* the position *c'*, and the point *d* the position *d'*. It will thus be seen from either of the diagrams Fig. 3 or Fig. 4 that in a hose made according to my invention, the sharp fold in the inner tube which is opposite the corresponding fold in the outer casing when the hose is in its flattened position, may be caused to assume a position at one side of the fold in the casing when the hose is expanded as when in use.

While I have not shown the inner tube as secured to the outer casing it may of course be lightly secured along a narrow longitudinal strip by cement or otherwise if desired, but it is preferable that it be free or so lightly secured that it can be removed when desired.

Having thus described my invention, what I claim and desire to protect by Letters Patent is:—

A hose comprising an outer casing and an inner tube of smaller diameter free to expand to the wall of the casing, the tube and casing being adapted when not in use to fold double at diametrically opposite points to provide flattened sides between the folds, the entire area of one of the flattened sides and the folds of the tube being composed of substantially non-expansible waterproofed fabric and the remainder of the tube being composed of a freely elastic material.

Signed at Newtown, county of Fairfield, State of Connecticut, this 1st day of February, 1916.

WILLIAM T. COLE.